Oct. 13, 1942.    F. W. SCHREIBER    2,298,424
ABSORBENT MATERIAL
Filed May 7, 1940

INVENTOR
FREDERICK W. SCHREIBER
BY George H. Lorch
ATTORNEY

Patented Oct. 13, 1942

2,298,424

UNITED STATES PATENT OFFICE 2,298,424

ABSORBENT MATERIAL

⁻rick W. Schreiber, Highland Park, N. J., as-
to Johnson & Johnson, New Brunswick,
N. J., a corporation of New Jersey Application May 7, 1940, Serial No. 333,742

3 Claims. (Cl. 128—270)

This invention relates to absorbent materials and more particularly to cellulosic absorbent materials.

A common absorbent material is, of course, cotton, but other and less expensive materials, such as purified cellulose both in sheets and fluffed fibre form, have been used as an absorbent material for hygienic and surgical purposes. Cellulosic materials, such as purified wood cellulose, however, do not swell markedly as they absorb moisture. This is a decided disadvantage in that it limits their uses to instances where swelling with absorption is not necessary or desired. Moreover, most, if not all cellulosic materials including cotton lose their resiliency when wetted and have a tendency to collapse when subjected to pressure in the wetted condition. There are many occasions where it is desirable to have an inexpensive absorbent material which swells as it absorbs liquids and which retains its resiliency when subjected to pressure after being wetted.

It is an object of this invention to provide an improved inexpensive cellulosic absorbent material particularly suitably for surgical dressings or the like that resists collapse, retains its resiliency when wetted and has a swelling characteristic whereby its bulk is increased upon absorption of a liquid.

It is a further object of this invention to provide an improved inexpensive cellulosic absorbent material having a controlled swelling characteristic whereby its bulk may be increased a predetermined degree upon wetting.

It is also an object of this invention to provide a tampon of cellulosic material having a controlled swelling characteristic.

It is another object of this invention to provide a novel method of producing an absorbent material that swells upon contact with aqueous liquids.

Other objects and advantages will be apparent to those skilled in the art.

Figure 1:
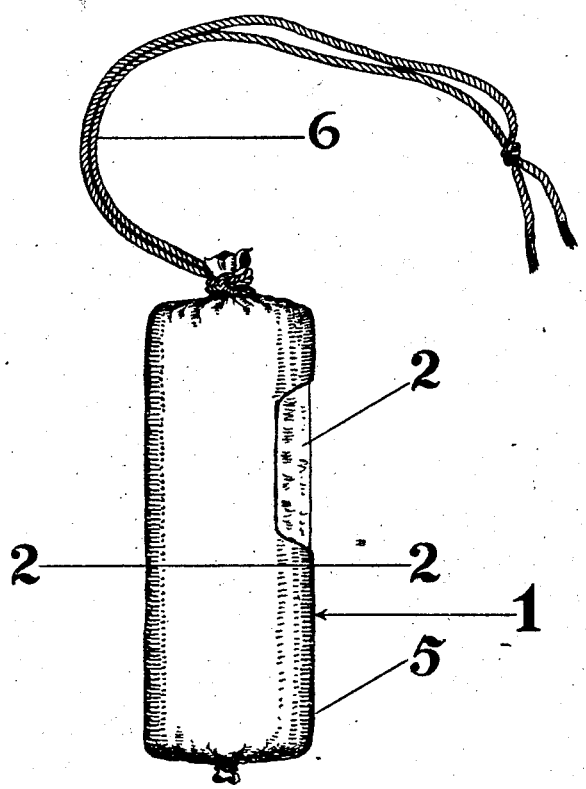
Figure 2:
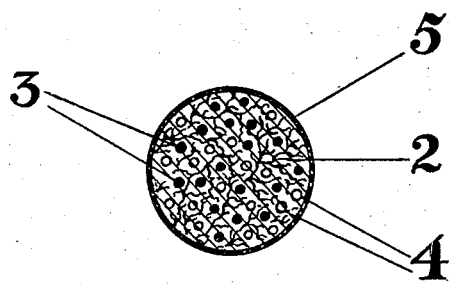

A more complete understanding of my invention may be had from the following description taken in connection with the accompanying drawing in which:

Figure 1 is a side elevation illustrating a tampon constructed of an absorbent material made in accordance with this invention, and Figure 2 is a transverse section taken on line 2—2 of Figure 1 and illustrating more particularly the composition of the absorbent material used in the tampon.

In general, a substance which swells upon being wetted is intimately admixed into a cellulose sheet or web preferably purified and also disintegrated into fluff form if desired, thus causing the entire mixture to expand and increase in bulk.

More specifically, and in practice, it is preferred to utilize a wood cellulose high in alpha content which is disintegrated in the usual manner to form an absorbent material of comminuted cellulosic fibers resembling cotton. To this disintegrated and fluffed absorbent material there is added a predetermined amount of a swelling agent, preferably a water soluble organic gum such as karaya gum, tragacanth, lakoe, or acacia. The swelling agent can be introduced into and intimately distributed and admixed with the cellulose fibres as a powder, which permits ready and thorough infiltration of the swelling agent into the pulp fibres.

The action of the foregoing resultant absorbent material is as follows: When aqueous fluids, particularly body fluids such as blood, serum, menstrual flow, etc., contact the absorbent they are immediately and rapidly absorbed by the cellulose fibres. These fibres now wetted contact the swelling agent which, in turn, takes up the aqueous fluid and swells to larger proportion, thus spreading or expanding the cellulose fibres and increasing the bulk of the entire admixture. This action continues until both the cellulose fibres and the swelling agent have absorbed the maximum amount of fluid. Since the swelling agent may be, and in the case of the mentioned agents are, absorbent, the resultant absorbent material thus prepared will retain greater quantities of fluid than cellulose alone. Furthermore, the swelling agent serves to inhibit collapse of the material when wetted and imparts a resiliency to the wetted material which causes it to tend to expand even under compression.

The total increase in bulk can be controlled to any desired or predetermined extents by the amount of swelling agent added to the cellulose fibres.

If it is desired also to accelerate or increase, the rate of absorption by the absorbent material, this may be accomplished by incorporating a wetting agent such as a sulphated higher alcohol, a sulphonated hydrocarbon, or similarly acting substance. A satisfactory wetting agent composed of sodium lauryl sulfate is now on the market under the trade name of "Duponol." The wetting agent can also advantageously be added and admixed in a powdered state at the same time the swelling agent is added, if it is so desired. Such an agent increases the rate at which the cellulose fibres take up moisture and therefore increases the rate of swelling when the agent is added to the absorbent material.

As can be seen from the drawing, an absorbent material prepared in accordance with this invention is admirably suited for the making of tampons, particularly vaginal or catamenial tampons for absorbing menstrual flow. In such usages it is desired that the tampon swell immediately upon being wetted to prevent seepage of the menstrual flow.

In the drawing there is illustrated such a tampon indicated generally by the reference character 1, comprising a body of cellulose fibres 2, into which is infiltrated and intimately admixed and distributed a predetermined amount of swelling agent, such as a finely divided or powdered water soluble gum 3. Karaya gum has been found very satisfactory for this purpose. If desired, a wetting agent 4, such as "Duponol," also in a finely divided or powdered state may be added by distributing it throughout the cellulosic fibres. The absorbent material thus prepared is compressed to a suitable size and density and is encased in a porous covering or bag 5, of any suitable material, such as "Masslinn," the latter being a porous, fibrous sheet bonded by latex. The cover serves to prevent sloughing off of cellulose fibres and to facilitate withdrawal of the tampon. A withdrawal cord 6, may be attached to the covering thus eliminating any tearing action on the cellulose fibres in removing the tampon.

The total expansion of the tampon can be controlled and determined by the amount of swelling agent incorporated in the absorbent material. Inasmuch as the cellulose fibres have no tendency of themselves to swell when wetted there is only one variable and this can readily be controlled.

From the foregoing it will be apparent that by this invention there is provided a low cost absorbent material having expanding qualities at least equal to that of cotton under compression and comprising a cellulosic material of cotton or other fiber that resists collapse when wetted due to the retention of its resiliency. Moreover, the swelling characteristic may be controlled readily and accurately both as to rate and extent. Other advantages and results will be apparent to those skilled in the art to whom variations from the described embodiment, without departure from the invention as defined in the claims may also be obvious.

I claim:

1. An absorbent material comprising a mass of comminuted cellulosic fibers and a water-soluble and expansible organic gum, said gum being present in a finely divided state distributed throughout the entire mass of said cellulosic fibers whereby the fibers of said absorbent material will be further separated upon absorption of a liquid and expansion of said gum.

2. An absorbent material comprising a mass of comminuted cellulosic fibers, a finely divided water-soluble and expansible organic gum distributed throughout the entire mass of said fibers whereby said fibers will be further separated as the gum expands upon absorption of a liquid, and a wetting agent in contact with said fibers for accelerating said expansion.

3. A tampon comprising a body of absorbent comminuted cellulosic fibers having a finely divided water-soluble organic gum distributed throughout said body and separating said fibers whereby said fibers will be further separated substantially individually and said tampon will expand upon absorbing a liquid and a porous covering enclosing said fibers and said gum.

FREDERICK W. SCHREIBER.